C. A. Ensign,

Manf. Elastic Fabrics.

No. 106,924. Patented Aug. 30, 1870.

2 Sheets, Sheet 1.

Witnesses
A. J. Tibbits
J. H. Shumway

Charles A. Ensign
Inventor
By his Attorney
Wm. E. Earle

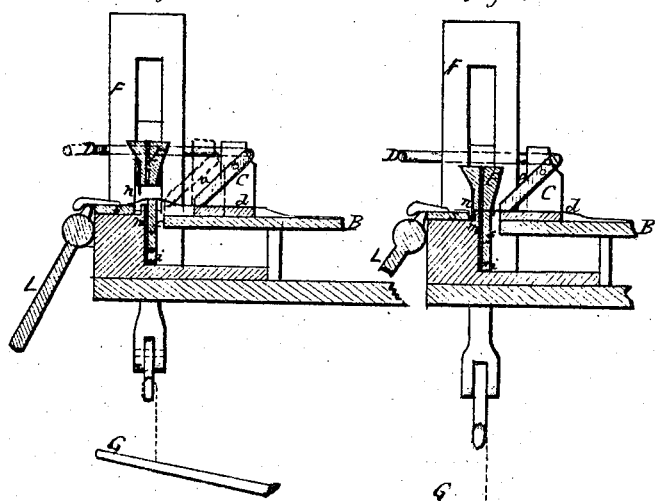

CHARLES A. ENSIGN, OF NAUGATUCK, CONNECTICUT.

Letters Patent No. 106,924, dated August 30, 1870.

IMPROVEMENT IN APPARATUS FOR THE MANUFACTURE OF ELASTIC FABRICS.

The Schedule referred to in these Letters Patent and making part of the same.

*To all whom it may concern:*

Be it known that I, CHARLES A. ENSIGN of Naugatuck, in the county of New Haven and State of Connecticut, have invented a new Improvement in Machine for Cutting and Hemming India-rubber Fabrics; and I do hereby declare the following, when taken in connection with the accompanying drawing and the letters of reference marked thereon, to be a full, clear, and exact description of the same, and which said drawing constitutes part of this specification, and represents in—

Figure 1:
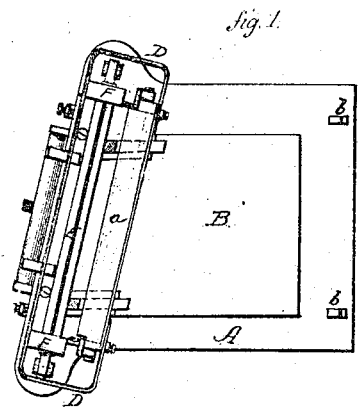
Figure 2:
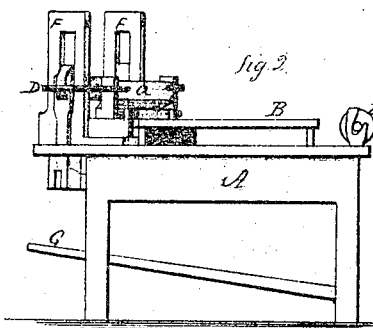
Figure 3:
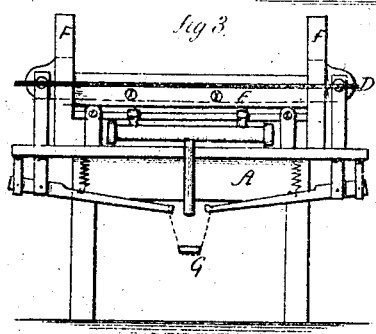

Figure 1, a top view;
Figure 2, a side view;
Figure 3, a front view; and in
Figures 4, 5, and 6, sectional views, to illustrate the operation of the machine.

This invention relates to the construction of a machine to facilitate the cutting and hemming of India-rubber or gummed fabrics, that is to say, fabrics which are coated with India-rubber or similar gums, and which are required to be cut into strips previous to vulcanization, made with special reference to cutting the diagonal fabrics known as the "Tyer and Helm patent of 1856," but alike applicable to the cutting of other gummed fabrics, the object of the machine being to feed or deliver the fabric, to hold the fabric while being cut, and to hem or double the fabric, so as to press the gummed surfaces doubled together; and The invention consists in the arrangement of a movable jaw or clamp, through which the fabric passes, combined with a slotted bar, through which the knife is inserted, guided by the said slot, to cut the fabric.

Also, in combining therewith a folder for hemming the fabric.

A is the table, upon which the machine is supported.

B, a platform, over which the fabric passes, delivered from a roll, supported in bearings $b$, as seen in fig. 2, the fabric being first gummed preparatory to vulcanization.

$a$ and $d$ are the two parts of a clamping device, the part $a$ hinged to an upright, C, on the part $d$, and the part $d$ fitted to move in suitable guides on the table B.

These parts are represented as working diagonally across the table, as required in cutting the diagonally-woven fabric before referred to. It may be proper here to remark that this fabric is used chiefly in making the elastic gore for over and other shoes.

The clamping device is moved by the hand of the operator, a loop, D, extending forward for that purpose.

E is a cross-bar, slotted, as seen in figs. 4, 5, and 6, and fitted to move up and down, properly guided in posts F, and is so moved, by the operator, by means of a treadle, G, connected to the said bar E, as seen in fig. 3.

Immediately below the bar E is arranged another bar, $f$, the front edge of which is in line with the slot through the bar E; and this said bar $f$ is arranged upon springs $i$, so as to be depressed by the bar E, as seen in fig. 5, and so as, by the reaction of the spring, to be raised, as seen in fig. 4, when free from the pressure of the bar E.

The fabric is passed through the clamping device, and below the bars E and $f$, and the clamping device, having been previously adjusted, is thrown back, as seen in fig. 4; then drawn forward, as denoted by broken lines, fig. 4, bringing the fabric with it, passing it out to the front, below the two bars E and $f$; then the bar E is depressed, as seen in fig. 5, grasping the fabric between the said two bars; then the clamping device is thrown back, to take a new hold upon the fabric, and the operator, passing his knife through the slot in the bar E, and guided by the said slot, draws the knife across the fabric, cutting off a strip; then the bar E is raised, which frees the strip, so that it may be removed. The clamp is again drawn forward, bringing the fabric with it, the bar depressed, and a strip cut as before, and so continuing, successive strips being cut at each operation.

To hem one edge, or double the fabric, I arrange upon the bar E a blade, $n$, denoted in solid black, so as to pass down forward of the ledge $m$, and a slide, $s$, in front, so that the blade will pass down, carrying the fabric between the ledge $m$ and the slide $s$, as seen in fig. 5; then, when the blade is withdrawn, leaving the fabric double between the said slide and ledge, the slide $s$ is forced forward by a lever, L, pressing the meeting surfaces of the fabric together, as seen in fig. 6, the gum causing them to adhere. The slide $s$ may be moved up before the blade is withdrawn, if necessary, to hold the fabric.

The elastic bar $f$ is made elastic for the purpose of raising the fabric to facilitate its delivery between the bars.

The feeding-clamp is made adjustable, so that different lengths may be fed, by adjusting the clamp accordingly.

I claim—

1. The feeding-clamp $a\ d$, combined with the slotted bar E, the said bar arranged to hold the fabric, and serve as a guide for the knife, substantially as set forth.

2. In combination with the slotted bar E and a feeding device for the fabric, the elastic bar $f$, substantially in the manner and for the purpose set forth.

3. In combination with the slotted bar E and a feeding device for the fabric, the blade $n$, arranged so as to double or hem the fabric, substantially in the manner described.

CHAS. A. ENSIGN.

Witnesses:
A. J. TIBBITTS,
JOHN H. SHUMWAY.